United States Patent
Fujiwara

(10) Patent No.: US 10,232,816 B2
(45) Date of Patent: Mar. 19, 2019

(54) VEHICLE SEAT HAVING A SIDE AIRBAG DEVICE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 15/402,333

(22) Filed: Jan. 10, 2017

(65) Prior Publication Data

US 2017/0259770 A1     Sep. 14, 2017

(30) Foreign Application Priority Data

Mar. 10, 2016   (JP) ................................ 2016-047193

(51) Int. Cl.
*B60R 21/207*     (2006.01)
*B60R 21/01*      (2006.01)
(Continued)

(52) U.S. Cl.
CPC ............ *B60R 21/207* (2013.01); *B60R 21/01* (2013.01); *B60R 21/0134* (2013.01);
(Continued)

(58) Field of Classification Search
CPC ........................... B60R 21/207; B60R 21/2165
See application file for complete search history.

(56) References Cited

U.S. PATENT DOCUMENTS 5,967,546 A * 10/1999 Homier ................ B60N 2/5883
                                                              280/730.2
6,439,597 B1 * 8/2002 Harada ................ B60R 21/207
                                                              280/728.2
(Continued)

FOREIGN PATENT DOCUMENTS

DE     102004003983 B3 * 12/2004 ........... B60R 21/207
JP         2000001153 A     1/2000
(Continued)

OTHER PUBLICATIONS

Determann et al., Frangible seam for motor vehicle seat airbag cover has rivetted overlapping sections of cover crossing seams, Sep. 12, 2004, EPO, DE 10 2004 003 983 B3, English Abstract (Year: 2004).*

(Continued)

*Primary Examiner* — James A English
(74) *Attorney, Agent, or Firm* — Oliff PLC

(57) ABSTRACT

A vehicle seat provided with a side airbag device including: a side airbag that is stored within a side portion of a seat back, and that receives gas supplied from an inflator so as to inflate and deploy at a side of a seated vehicle occupant; seat back upholstery that forms upholstery for the seat back, and in which a burst line portion, which is a seam portion, ruptures when it receives inflation pressure from the side airbag, and in which a three-way junction is formed in a seam portion as a result of a seam portion that branches off from the burst line portion being provided; and reinforcement fabric that is joined to both a portion of the burst line portion that bridges an intersection point of the three-way junction and a seat back frame, and that stretches when it receives inflation pressure from the side airbag.

8 Claims, 8 Drawing Sheets

(51) Int. Cl.
*B60R 21/0134* (2006.01)
*B60R 21/0136* (2006.01)
*B60R 21/233* (2006.01)
*B60R 21/2338* (2011.01)
*B60R 21/2346* (2011.01)
*B60R 21/264* (2006.01)
*B60R 21/00* (2006.01)

(52) U.S. Cl.
CPC ........ *B60R 21/0136* (2013.01); *B60R 21/233* (2013.01); *B60R 21/2338* (2013.01); *B60R 21/2346* (2013.01); *B60R 21/264* (2013.01); *B60R 2021/0006* (2013.01); *B60R 2021/01286* (2013.01); *B60R 2021/2076* (2013.01); *B60R 2021/23316* (2013.01); *B60R 2021/23324* (2013.01); *B60R 2021/23382* (2013.01)

(56) References Cited

U.S. PATENT DOCUMENTS

| | | | | |
|---|---|---|---|---|
| 7,695,064 | B2* | 4/2010 | Thomas | B60N 2/58 280/728.3 |
| 8,899,616 | B2* | 12/2014 | Moore | B60R 21/207 280/728.3 |
| 9,027,958 | B2* | 5/2015 | Tracht | B60R 21/207 280/728.3 |
| 2009/0051148 | A1* | 2/2009 | Osterhout | B60R 21/207 280/728.3 |
| 2010/0187798 | A1* | 7/2010 | Deppe | B60R 21/201 280/743.1 |
| 2012/0025499 | A1* | 2/2012 | Shibayama | B60R 21/233 280/730.2 |
| 2014/0210192 | A1* | 7/2014 | Hotta | B60R 21/23138 280/730.2 |
| 2014/0312664 | A1* | 10/2014 | Tanabe | B60R 21/207 297/216.13 |
| 2015/0217714 | A1* | 8/2015 | Fujiwara | B60R 1/23138 280/729 |
| 2016/0167611 | A1* | 6/2016 | Fujiwara | B60R 21/207 297/216.13 |

FOREIGN PATENT DOCUMENTS

| | | |
|---|---|---|
| JP | 2001-219808 A | 8/2001 |
| JP | 2002002344 A | 1/2002 |
| JP | 2003-341461 A | 12/2003 |
| JP | 2007-045262 A | 2/2007 |
| JP | 2010-030389 A | 2/2010 |
| JP | 2015009727 A | 1/2015 |
| JP | 2016007901 A | 1/2016 |

OTHER PUBLICATIONS

Determann et al., Frangible seam for motor vehicle seat airbag cover has rivetted overlapping sections of cover crossing seams, Sep. 12, 2004, EPO, DE 10 2004 003 983 B3, Machine Translation of Description (Year: 2004).*

* cited by examiner

VEHICLE SEAT HAVING A SIDE AIRBAG DEVICE

CROSS-REFERENCE TO RELATED APPLICATION

This application is based on and claims priority under 35 U.S.C. 119 from Japanese Patent Application No. 2016-047193 filed on Mar. 10, 2016, the disclosure of which is incorporated by reference herein.

BACKGROUND

Technical Field

The present disclosure relates to a vehicle seat that is provided with a side airbag device.

Related Art

In a side airbag device for a vehicle seat that is disclosed in Japanese Patent Application Laid-Open (JP-A) No. 2003-341461, a burst line portion which is a seam line (i.e., a seam portion) in the seat back upholstery receives inflation pressure from the side airbag, and ruptures. Reinforcement fabric that is used to concentrate the inflation pressure from the side airbag in the burst line portion is suspended between the burst line portion and the seat back frame. In this reinforcement fabric, a seam edge that is sewn in the seat back upholstery so as to follow the burst line portion is formed longer than a join edge where the reinforcement fabric is joined to the seat back frame.

In this vehicle seat, in some cases, in order to improve the aesthetic appearance, the seam portions in the seat back upholstery are set in a complex configuration. For example, in some cases, a three-way junction of seam portions is formed by providing a seam portion that branches off from the seam portion that forms the burst line portion.

In the case of this type of structure, in the aforementioned three-way junction, a loss occurs during the transmission of the load needed to rupture the burst line portion. If, as a result of this, a delay occurs in the rupturing of the burst line portion, there is a possibility that the side airbag will not inflate and deploy in the desired position.

SUMMARY

The present disclosure was conceived in view of the above-described circumstances, and the present disclosure provides a vehicle seat having a side airbag device that, when a three-way junction is formed in a seam portion by providing a seam portion that branches off from a burst line portion which forms part of the seam portion in seat back upholstery, makes it possible to prevent a delay from occurring in the rupturing of the burst line portion in this three-way junction.

A vehicle seat having a side airbag device according to a first aspect of the present disclosure includes a side airbag that is stored inside a side portion of a seat back, and that receives gas supplied from an inflator so as to inflate and deploy at a side of a seated vehicle occupant, seat back upholstery that forms upholstery for the seat back, and in which a burst line portion, which is a seam portion, ruptures when it receives inflation pressure from the side airbag, and in which a three-way junction is formed in a seam portion as a result of a seam portion that branches off from the burst line portion being provided, and reinforcement fabric that is joined to both a portion of the burst line portion that bridges an intersection point of the three-way junction and a seat back frame, and that stretches when it receives inflation pressure from the side airbag.

In the first aspect of the present disclosure, a side airbag that is stored within a side portion of a seat back receives gas that is supplied from an inflator and consequently is inflated and deployed at the side of a seated vehicle occupant. During this inflation and deployment, a burst line portion, which is a seam portion in the seat back upholstery, receives inflation pressure from the side airbag and ruptures. In this seat back upholstery, as a result of a front seam portion which branches off from the burst line portion being provided, a three-way junction of seam portions is formed, and reinforcement fabric is joined to the portion of the burst line portion that bridges an intersection point of the three-way junction, and to a seat back frame. As a result of the reinforcement fabric receiving inflation pressure from the side airbag and being stretched, the inflation pressure from the side airbag is concentrated in the portion of the burst line portion that bridges the intersection point. As a consequence, it is possible to prevent a delay from occurring in the rupturing of the burst line portion in the three-way junction.

A vehicle seat having a side airbag device according to a second aspect of the present disclosure is characterized in that, in the first aspect, the side airbag is partitioned into plural inflating portions, and one portion of a high-pressure inflating portion which inflates and deploys the earliest and at the highest pressure from among the plural inflating portions inflates and deploys further to a seat front side than the burst line portion at a height where the reinforcement fabric is located.

In the second aspect of the present disclosure, because a structure such as that described above is employed, the reinforcement fabric receives inflation pressure from the high-pressure inflating portion which inflates and deploys the earliest and at the highest pressure from among the plural inflating portions of the side airbag and is stretched, and the inflation pressure from the high-pressure inflating portion is concentrated in the portion of the burst line portion that bridges the intersection point of the three-way junction. As a consequence, it is possible to cause the portion of the burst line portion that bridges the intersection point to be ruptured at an early stage.

A vehicle seat having a side airbag device according to a third aspect of the present disclosure is characterized in that, in the second aspect, the one portion includes a shoulder restraining portion that restrains a shoulder portion of a seated vehicle occupant from a side.

In the third aspect of the present disclosure, the portion of the burst line portion that bridges the intersection point of the three-way junction is made to rupture at an early stage, and one portion of the high-pressure inflating portion that inflates and deploys further to the seat front side than the burst line portion includes the shoulder restraining portion that restrains the shoulder portion of the vehicle occupant from the side. Here, as a result of a shoulder portion of an adjacent vehicle occupant or a vehicle body side portion being present at the side of the shoulder portion of the seated vehicle occupant, in some cases the space where the side airbag is inflated and deployed may be narrow. Even in cases such as this, by employing the above-described structure, the shoulder restraining portion can be inflated and deployed rapidly in this narrow space.

A vehicle seat having a side airbag device according to a fourth aspect of the present disclosure is characterized in that, in any one of the first through third aspects, a height where a center of a shoulder portion of a seated vehicle occupant is located is also situated at a height in an up-down direction of the seat back where a join portion where the reinforcement fabric is joined to the burst line portion is located.

In the fourth aspect of the present disclosure, because a structure such as that described above is employed, the burst line portion can be ruptured at an early stage at the height in the up-down direction of the seat back where the center of the shoulder portion of the seated vehicle occupant is located. As a consequence, the side airbag can be inflated and deployed rapidly in the narrow space at the above-described side of the shoulder portion.

A vehicle seat having a side airbag device according to a fifth aspect of the present disclosure is characterized in that, in any one of the first through fourth aspects, the side airbag is stored within a side portion on a center side in a vehicle transverse direction of the seat back, and the side airbag is surrounded in this stored state from both sides in a seat transverse direction by the reinforcement fabric.

According to the fifth aspect of the present disclosure, the side airbag is what is known as a far side airbag that is stored within a side portion on a center side in the vehicle transverse direction of the seat back. Here, there are cases when a far side airbag is inflated and deployed later temporally than a side airbag (what is known as a near side airbag) that is stored within a side portion on the outer side in the vehicle transverse direction of the seat back. During the inflation and deployment of a near side airbag, the seam portion in the seat back upholstery ruptures in the side portion on the outer side in the vehicle transverse direction of the seat back. As a result, because the tension in the seat back upholstery is reduced, it becomes difficult for the burst line portion on the center side in the vehicle transverse direction to be ruptured by the inflation pressure of the far side airbag.

For this reason, in the present disclosure, the reinforcement fabric that is joined to the burst line portion and the seat back frame surrounds the far side airbag when this is in a stored state from both sides in the seat transverse direction. As a consequence, irrespective of any decrease in the tension of the seat back upholstery, because the inflation pressure of the far side airbag is transmitted to the burst line portion via the reinforcement fabric, the burst line portion can be reliably ruptured.

As has been described above, in the vehicle seat having a side airbag device according to the present disclosure, it is possible to prevent a delay occurring in the rupturing of a burst line portion in a three-way junction when a three-way junction is formed in a seam portion as a result of a seam portion being provided that branches off from the burst line portion that forms the seam portion in seat back upholstery.

BRIEF DESCRIPTION OF THE DRAWINGS

Exemplary embodiments of the present disclosure will be described in detail based on the following figures, wherein.

DETAILED DESCRIPTION

Figure 1:
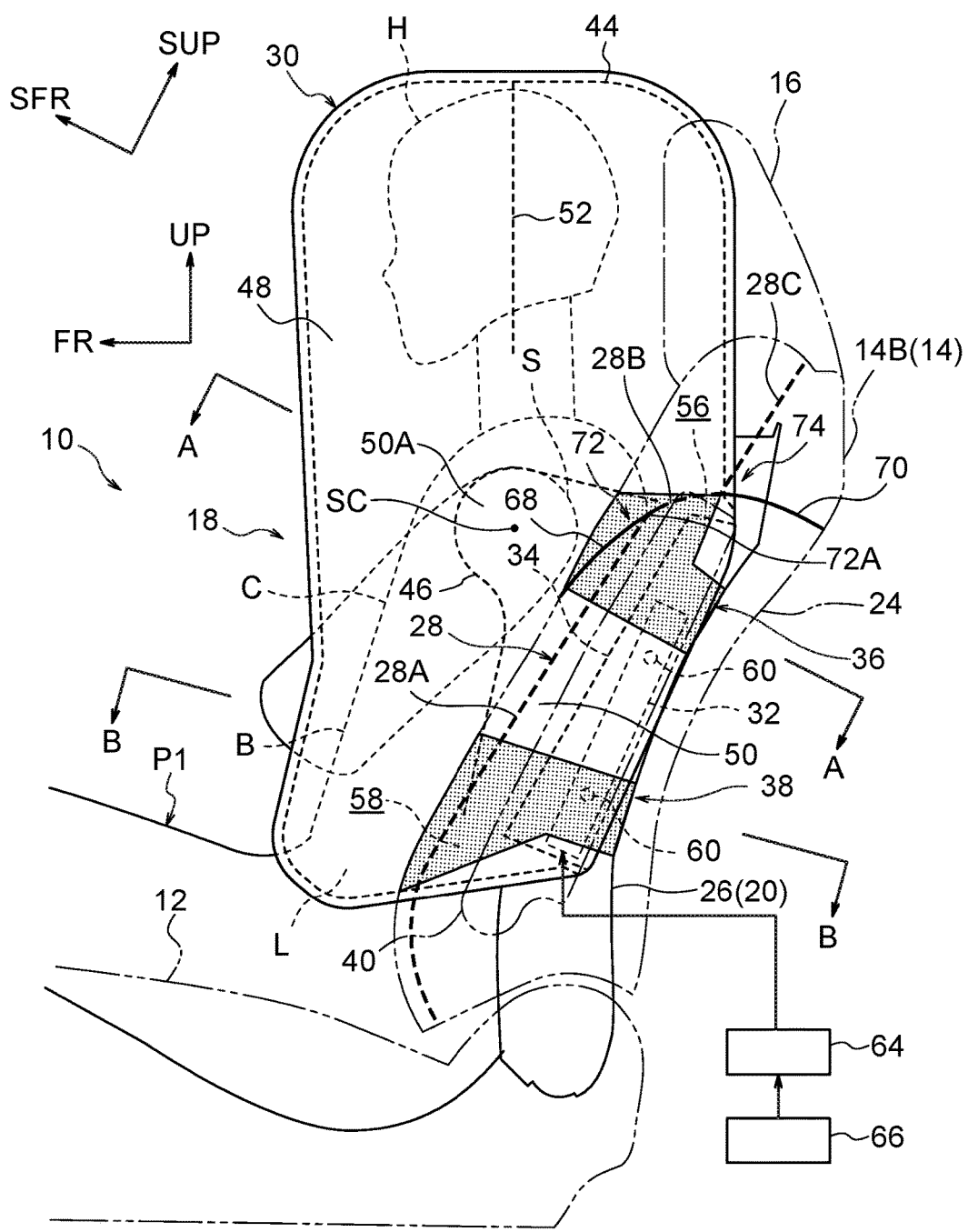
FIG. 1 is a side view of a vehicle seat having a side airbag device according to an exemplary embodiment of the present disclosure, and shows a side airbag in an inflated and deployed state.

Hereinafter, a vehicle seat 10 having a side airbag device according to an exemplary embodiment of the present disclosure (hereinafter, referred to simply as a 'vehicle seat 10') will be described using FIG. 1 through FIG. 8. Note that an arrow FR, an arrow UP, and an arrow OUT that are shown where appropriate in the drawings respectively indicate a forward direction (i.e., a direction of travel) of a vehicle, an upward direction, and an outer side in a vehicle transverse direction. Hereinafter, unless specifically stated otherwise, if simple front-rear, left-right, or up-down directions are used, then these refer respectively to the front-rear direction of the vehicle, the left-right direction of the vehicle (i.e., left and right in the vehicle transverse direction), and the up-down direction of the vehicle. Moreover, in each of the drawings, in some cases a portion of the descriptive symbols has been omitted in order to make the drawing easier to view.

(Structure)

Firstly, an outline of the overall structure of the vehicle seat 10 will be described, and thereafter, principal portions of the present exemplary embodiment will be described. As is shown in FIG. 1, the vehicle seat 10 is provided with a seat cushion 12, a seat back 14 joined to a rear end portion of the seat cushion 12, and a headrest 16 joined to an upper end portion of the seat back 14. This vehicle seat 10 is also provided with a far side airbag device 18 that serves as a side airbag device which is mounted in the seat back 14.

Note that, in the present exemplary embodiment, the front-rear direction, the left-right direction (i.e., the transverse direction), and the up-down direction of this vehicle seat 10 match the front-rear direction, the left-right direction, and the up-down direction of the vehicle. Moreover, an arrow SFR that is shown where appropriate in the drawings indicates a front side of the seat back 14, while an arrow SUP indicates an upper part of the seat back 14. The transverse direction (i.e., the left-right direction) of the seat back 14 matches the seat transverse direction (i.e., the vehicle transverse direction).

Figure 2:
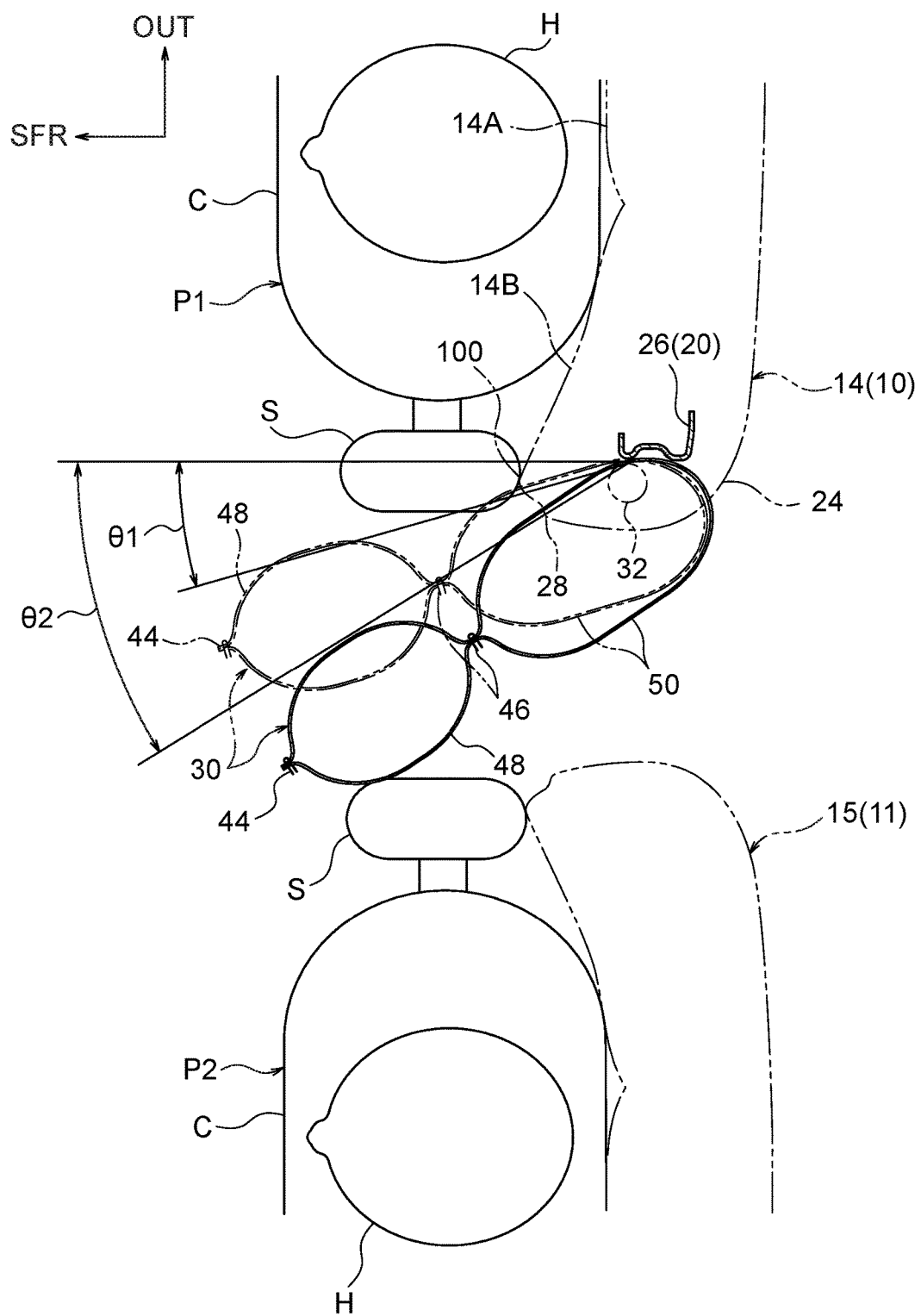
FIG. 2 is a cross-sectional view showing the structure of an area that includes a cross-sectional plane taken along a line A-A in FIG. 1.

The above-described vehicle seat 10 is, for example, the driver's seat of a right-hand drive vehicle and, as is shown in FIG. 2, is disposed on one side (i.e., the right-hand side) of a vehicle seat 11, which is a front passenger's seat. Note that, in FIG. 2, the symbol 15 is used to show the seat back of the vehicle seat 11. In this structure, a vehicle far side airbag device is not mounted in the seat back 15 of the vehicle seat 11.

Moreover, in FIG. 1 and FIG. 2, an impact test dummy P1 is seated in the vehicle seat 10, while in FIG. 2, an impact test dummy P2 is seated in the vehicle seat 11. For example, a World SID (internationally integrated side impact dummy: World Side Impact Dummy) AM50 (i.e., the 50th percentile of American adult males) is used for these dummies P1 and P2. These dummies P1 and P2 are seated in a standard sitting posture that is determined using a collision test method. Moreover, the front-rear position of the seat cushion 12 relative to the vehicle, and the tilt position (i.e., the tilt angle) of the seat back 14 relative to the seat cushion 12 are also adjusted to standard set positions that correspond to the aforementioned sitting posture. The above-described dummy P1 corresponds to a 'seated vehicle occupant' according to the present disclosure. The dummies P1 and P2 are referred to hereinafter as a 'vehicle occupant P1' and a 'vehicle occupant P2'.

Figure 3:
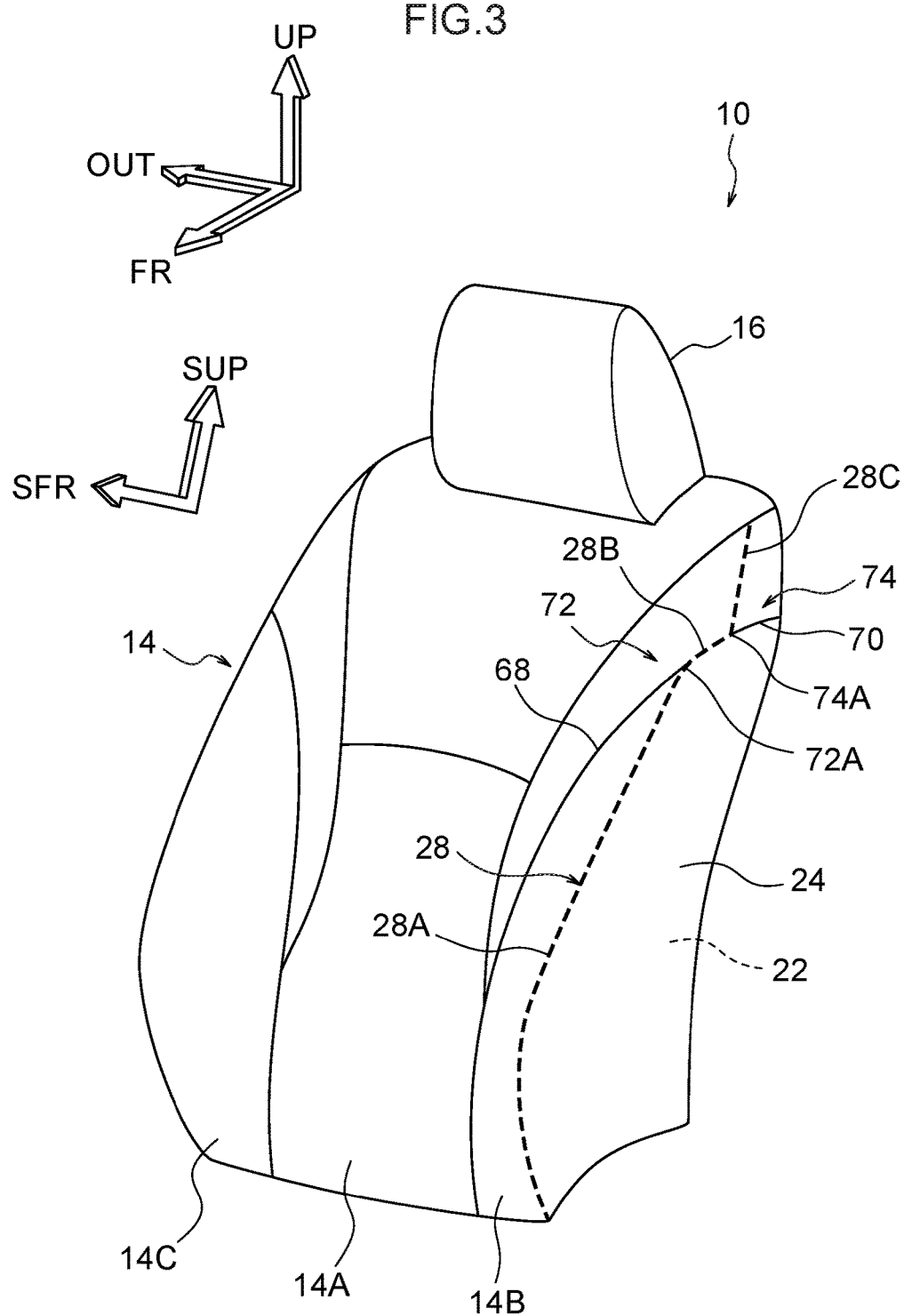
FIG. 3 is a perspective view of a seat back provided in the aforementioned vehicle seat.
Figure 4:
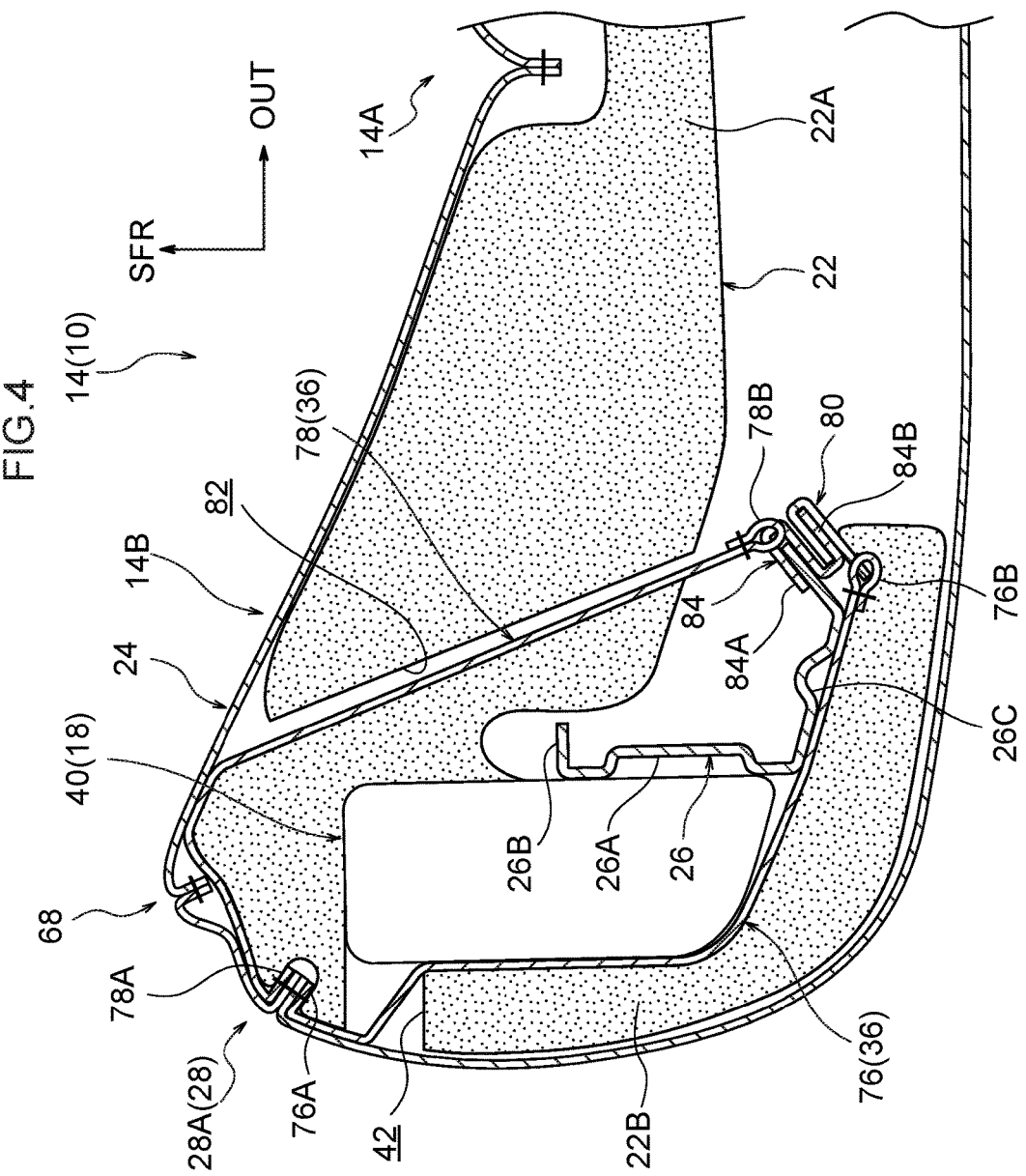
FIG. 4 is an enlarged cross-sectional view showing an enlargement of the cross-sectional plane taken along a line A-A in FIG. 1, and shows a state prior to the inflation and deployment of a side airbag.
Figure 5:
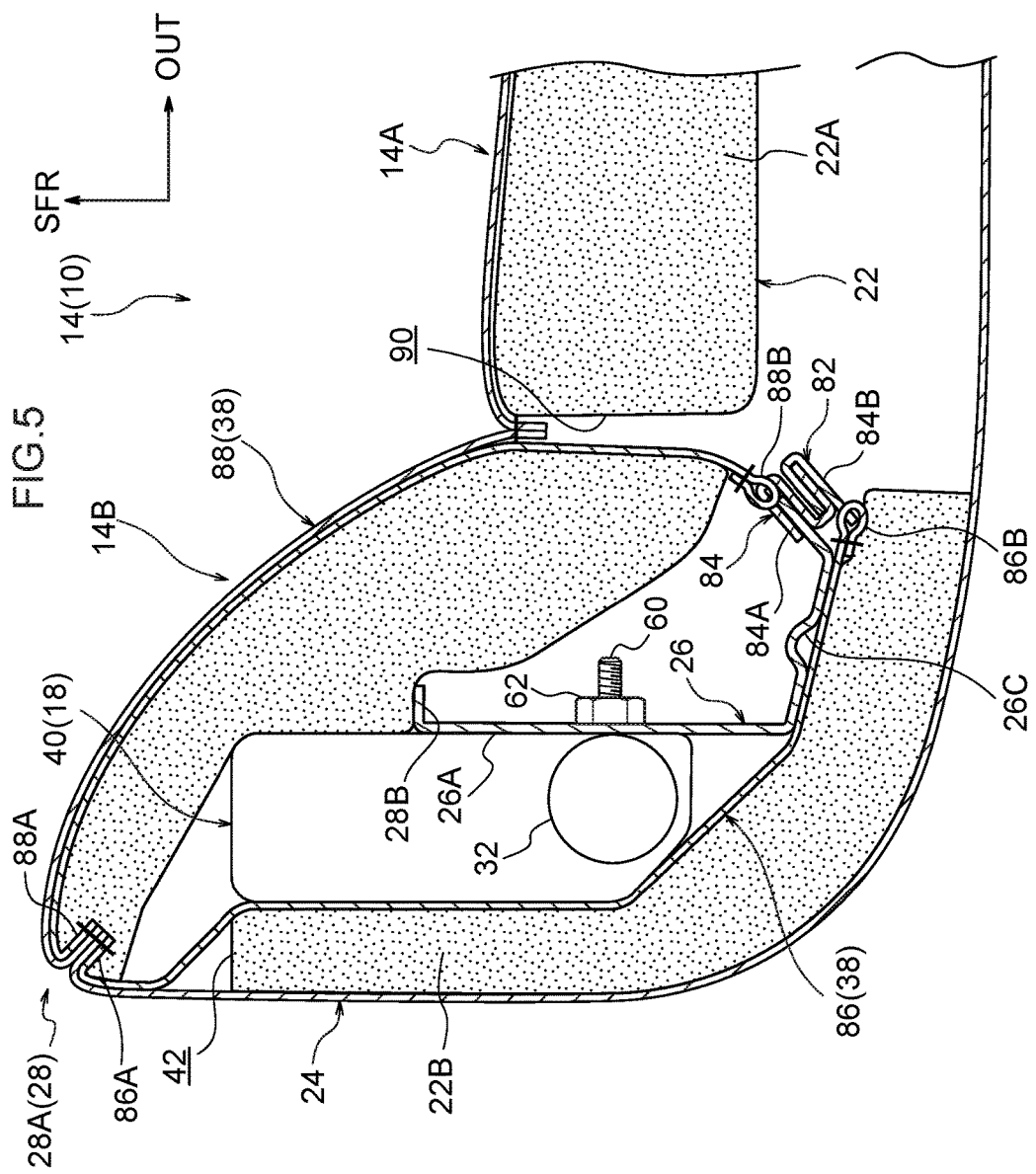
FIG. 5 is an enlarged cross-sectional view showing an enlargement of a cross-sectional plane taken along a line B-B in FIG. 1, and shows a state prior to the inflation and deployment of a side airbag.

As is shown in FIG. 3 through FIG. 5, in the seat back 14 of the vehicle seat 10, a central portion in the left-right direction is formed as a main body portion 14A, while both side portions in the left-right direction are formed as side support portions 14B and 14C. A structure is employed in which the left and right side support portions 14B and 14C protrude on the seat back forward side beyond the main body portion 14A, and support the upper body of a vehicle occupant who is reclining on the main body portion 14A from outer sides in the seat transverse direction. In the present exemplary embodiment, the side support portion 14B, which is on the center side in the vehicle transverse direction, corresponds to a 'seat back side portion' according to the present disclosure. Hereinafter, the side support portion 14B, which is on the center side in the vehicle transverse direction, is referred to as a 'center-side side support portion 14B'.

As is shown in FIG. 4 and FIG. 5, in the above-described seat back 14, a seat back pad 22 that is attached to a seat back frame 20 is covered by seat back upholstery 24. The seat back frame 20 forms a framework for the seat back 14, and is provided with left and right side frames 26 (the side frame 26 on the outer side in the vehicle transverse direction is omitted from the drawings) that extend in the up-down direction (i.e., the longitudinal direction) of the seat back 14 on both the left and right sides of the seat back 14. Upper end portions of the left and right side frames 26 are joined together in the seat transverse direction by an upper frame (not shown in the drawings), while lower end portions of the left and right side frames 26 are joined together in the seat transverse direction by a lower frame (not shown in the drawings).

As is shown in FIG. 4 and FIG. 5, the side frame 26 on the center side in the vehicle transverse direction has a side wall portion 26A that extends in the seat front-rear direction when seen in a planar cross-sectional view of the seat back 14, a front flange portion 26B that extends towards an inner side in the seat transverse direction from a front end of the side wall portion 26A, and a rear flange portion 26C that extends towards the inner side in the seat transverse direction from a rear end of the side wall portion 26A. Hereinafter, the side frame 26 on the center side in the vehicle transverse direction is referred to as a 'center-side side frame 26'. Note that the side frame 26 on the outer side in the vehicle transverse direction, which is not shown in the drawings, is formed in a left-right symmetrical configuration with the center-side side frame 26.

The seat back pad 22 forms a cushion material for the seat back 14. This seat back pad 22 is provided with a pad main body portion 22A that is provided on the main body portion 14 of the seat back 14, and with a pad side portion 22B (the pad side portion 22B on the outer side in the vehicle transverse direction is omitted from the drawings) that is provided on the left and right side support portions 14B and 14C. The left and right pad side portions 22B are formed having a substantially C-shaped cross-section whose inner side in the seat transverse direction is open when seen from the seat back up-down direction, and that surrounds the left and right side frames 26 from the seat back front-rear direction and the outer side in the seat transverse direction.

The seat back upholstery 24 forms the upholstery of the seat back 14, and covers the seat back pad 22. This seat back upholstery 24 is formed by sewing together plural upholstery pieces that are formed from fabric, leather, synthetic leather or the like via plural seam portions. Note that, in FIG. 3, the lines drawn on the surface of the seat back 14 all show seam portions. Moreover, seam portions that form burst line portions 28 are included in the seam portions that are set in the center-side side support portions 14B. The burst line portions 28 are described below in detail. Note that, in FIG. 1, FIG. 3, and FIG. 7, in order to make the burst line portions 28 easier to recognize, the burst line portions 28 are shown as thick, broken lines.

The far side airbag device 18 is provided in the center-side side portion 14B. As is shown in FIG. 1, FIG. 2, FIG. 6, and FIG. 7, the far side airbag device 18 is provided with a far side airbag 30 which is a bag body (hereinafter, referred to as a 'side airbag 30'), an inflator 32 that is housed inside the side airbag 30, and a diffuser 34 that regulates a gas that is generated from the inflator 32.

Furthermore, the far side airbag device 18 is provided with upper-side reinforcement fabric 36 and lower-side reinforcement fabric 38 that are used to assist the inflation and deployment of the side airbag 30. Note that, in FIG. 1, FIG. 6, and FIG. 8, in order to make the upper-side reinforcement fabric 36 and the lower-side reinforcement fabric 38 easier to recognize, the upper-side reinforcement fabric 36 and the lower-side reinforcement fabric 38 are shown using dots. The upper-side reinforcement fabric 36 and the lower-side reinforcement fabric 38 are described below in further detail. Firstly, the structures of the side airbag 30, the inflator 32, and the diffuser 34 will be described.

(Structure of the Side Airbag)

Normally, the side airbag 30 is formed as a module together with the inflator 32 and the diffuser 34, and is folded in a predetermined type of fold such as a bellows fold or a roll fold. By wrapping the folded side airbag 30 in an easily ruptured wrapping material, an elongated, rectangular parallelepiped-shaped airbag package 40 (see FIG. 1, FIG. 4, and FIG. 5) is formed. This airbag package 40 is housed within the center-side side support portion 14B such that the longitudinal direction thereof is aligned in the up-down direction of the seat back 14, and is disposed on the outer side in the seat transverse direction (i.e., the center side in the vehicle transverse direction) of the center-side side frame 26.

When the inflator 32 is operated, the side airbag 30 is inflated and deployed (see FIG. 1 and FIG. 2) at the side of the vehicle occupant P1 (here, this is the center side in the vehicle transverse direction of the vehicle occupant P1) by the pressure of the gas that is generated from the inflator 32. During this inflation and deployment, the side airbag 30 passes through a slit 42 (see FIG. 4 and FIG. 5) that is formed in the seat back pad 22, and this structure causes the burst line portion 28 of the seat back upholstery 24 to be ruptured. This slit 42 extends in the up-down direction of the seat back 14 along a front edge portion of the airbag package 40, and also extends in the front-rear direction of the seat back 14 along an upper edge portion of the airbag package 40. Note that, in the following description, unless specifically stated otherwise, the front-rear, left-right, and up-down directions as they relate to the side airbag 30 indicate directions when the side airbag 30 is in an inflated and deployed state, and substantially coincide with the front-rear, left-right, and up-down directions of the vehicle seat 10.

As is shown in FIG. 1, FIG. 2, FIG. 6, and FIG. 7, here, the side airbag 30 is what is known as a two-chamber type of airbag. This side airbag 30 is formed in an elongated bag shape by, for example, folding a single piece of base fabric in two, and then sewing outer peripheral edge portions thereof together so as to form an outer peripheral seam portion 44. This base fabric is formed by cutting out a flexible sheet-shaped material (for example, a nylon-based or polyester-based fabric). Note that the method used to manufacture the side airbag 30 is not limited to that described above, and may be altered as is appropriate. For example, it is also possible to employ a structure in which the side airbag 30 is manufactured by superimposing two sheets of base fabric on top of each other and then sewing together outer peripheral edge portions thereof. It is also possible, for example, to employ a structure in which the side airbag 30 is manufactured via a one-piece weaving process (known as an OPW manufacturing process) using an automatic weaving machine.

As is shown in FIG. 1, this side airbag 30 is formed such that, when viewed in an inflated and deployed state from the seat transverse direction, it appears in a substantially rectangular shape that is elongated in the vehicle up-down direction. This side airbag 30 is formed at a size that enables it to protect the vehicle occupant P1 from a head portion H to a hip portion L thereof (i.e., the head portion H, a shoulder portion S, a chest portion C, an abdominal portion B, and the hip portion L). Note that the size of the side airbag 30 is not limited to that described above. For example, the side airbag 30 may also be formed at a size that enables it to protect from the head portion H to the abdominal portion B.

The side airbag 30 is partitioned by a partitioning portion 46 into a front bag portion 48 that protects (i.e., restrains) front portions of the chest portion C, the abdominal portion B, and the hip portion L, as well as the head portion H of the vehicle occupant P1, and a rear bag portion 50 that protects (i.e., restrains) rear portions of the chest portion C, the abdominal portion B, and the hip portion L, as well as the shoulder portion S of the vehicle occupant P1. The front bag portion 48 and the rear bag portion 50 correspond to a 'plural inflating portions' according to the present disclosure. Moreover, an upper end side of the front bag portion 48 is partitioned into front and rear portions by a seam portion 52 that extends in the up-down direction of the side airbag 30.

The partitioning portion 46 is formed by a seam portion 54 where the base fabric of the side airbag 30 is sewn together, and an upper-side communicating aperture 56 and a lower-side communicating aperture 58 (namely, by two communicating apertures). The seam portion 54 is provided with an up-down partitioning portion 54A that extends from a rear end side of the side airbag 30 towards the center side thereof in a central portion in the up-down direction of the side airbag 30, and a front-rear partitioning portion 54B that extends from a lower end side of the side airbag 30 towards the center side thereof in a central portion in the front-rear direction of the side airbag 30. The up-down partitioning portion 54A partitions the rear portion of the side airbag 30 into upper and lower portions, while the front-rear partitioning portion 54B partitions the lower portion of the side airbag 30 into front and rear portions. Furthermore, this seam portion 54 is also provided with a circular arc-shaped circular arc partitioning portion 54C that joins together a top end of the front-rear partitioning portion 54B and a front end of the up-down partitioning portion 54A.

As is shown in FIG. 1, when the side airbag 30 is viewed in an inflated and deployed state from the seat transverse direction, the up-down partitioning portion 54A extends towards the vehicle rear side from the vicinity of the top end of the shoulder portion S of the vehicle occupant P1, and the front-rear partitioning portion 54B faces central portions in the front-rear direction of the chest portion C and the abdominal portion B of the vehicle occupant P1. Moreover, the circular arc partitioning portion 54C is formed as a circular arc that is centered on a center SC of the shoulder portion S, and that protrudes towards the seat front side. As a consequence, a shoulder restraining portion 50A is provided in an upper portion of the rear bag portion 50. This shoulder restraining portion 50A is formed so as to protrude further to the front side of the seat back 14 than other portions of the rear bag portion 50, and is formed such that the shoulder portion S of the vehicle occupant P1 is restrained from the side by the shoulder restraining portion 50A. Note that the aforementioned center SC is the axial center of a bolt (not shown in the drawings) that is provided in the shoulder portion S of the vehicle occupant P1 (i.e., of the dummy P1).

The upper-side communicating aperture 56 and the lower-side communicating aperture 58 are what are known as inner vent holes, and are formed by omitting portions of the seam portion 54. The upper-side communicating aperture 56 is set in an upper end portion of the partitioning portion 46, and enables an upper portion of the interior of the front bag portion 48 and an upper end portion of the interior of the rear bag portion 50 to communicate with each other in the up-down direction of the side airbag 30 in a central portion in the up-down direction of the rear end portion of the side airbag 30. The lower-side communicating aperture 58 is set in a lower end portion of the partitioning portion 46, and enables a lower end portion of the interior of the front bag portion 48 and a lower end portion of the interior of the rear bag portion 50 to communicate with each other in the front-rear direction of the side airbag 30 in a central portion in the front-rear direction of the lower end portion of the side airbag 30. Note that it is also possible to employ a structure in which a tether (i.e., partitioning fabric: barrier wall) is provided as a partitioning portion inside the side airbag 30. In this case, a structure is employed in which a communicating aperture (i.e., an aperture) is formed in the tether.

(Structures of the Inflator and Diffuser)

The inflator 32 and the diffuser 34 are housed in a rear end portion of the interior of the rear bag portion 50. The diffuser 34 is a component that is also known as a loop diffuser, an inner tube, and a regulating cloth. This diffuser 34 is formed by sewing into a cylinder shape a single sheet of base fabric that is formed from a flexible, sheet shaped material (here, the same type of fabric as the base fabric used for the side airbag 30).

Figure 6:
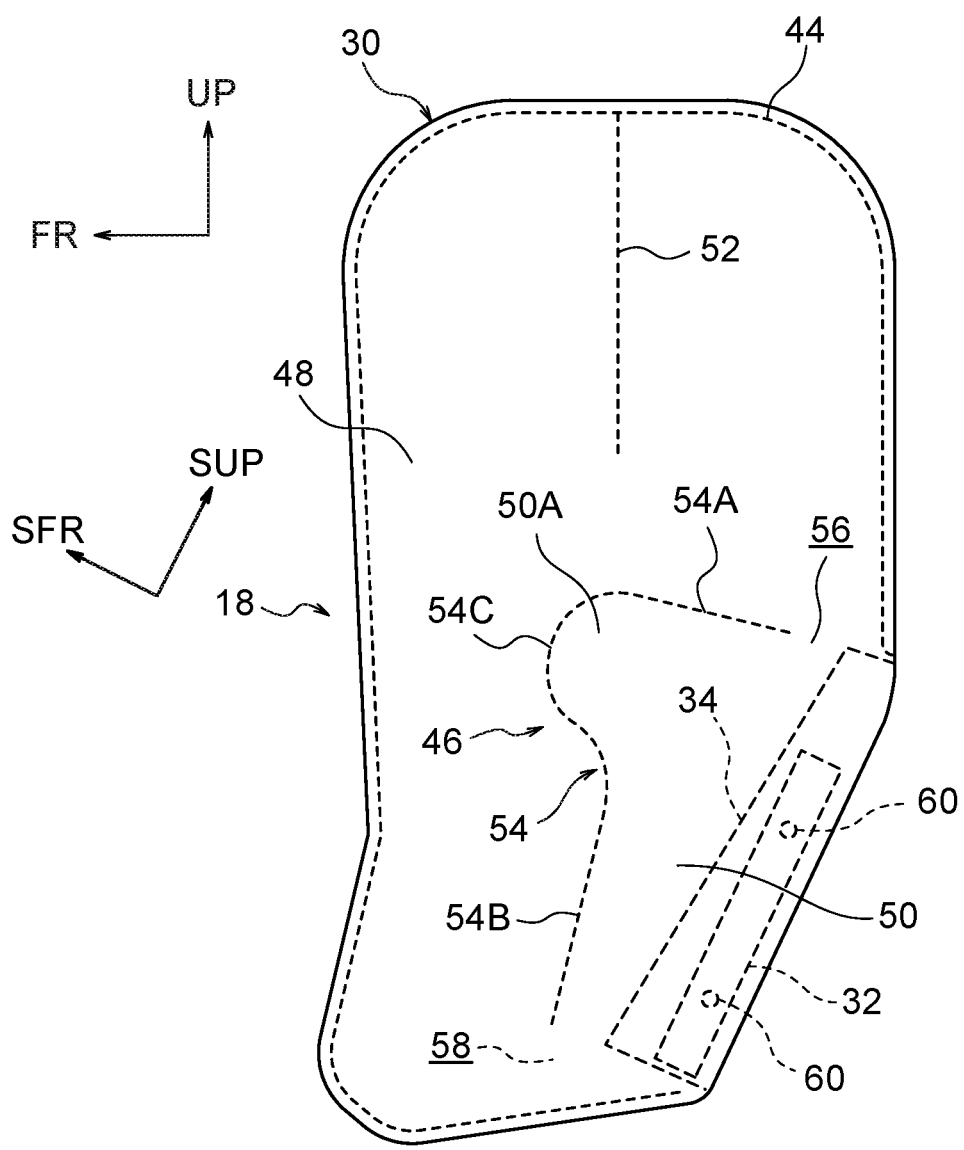
FIG. 6 is a side view of the side airbag shown in FIG. 1.

The diffuser 34 is disposed in an attitude in which an axial direction thereof is aligned in the up-down direction of the seat back 14. The diffuser 34 is formed such that a diameter thereof becomes gradually larger as it moves from a top end towards a bottom end thereof. An aperture area of a bottom end aperture that is formed at this bottom end is set larger than an aperture area of a top end aperture that is formed at the top end thereof. As is shown in FIG. 6, dimensions in a longitudinal direction of this diffuser 34 are set such that the top end aperture is located adjacent to the upper-side communicating aperture 56, and the bottom end aperture is located adjacent to the lower-side communicating aperture 58. The diffuser 34 is provided with a function of dispersing the gas generated from the inflator 32 in up-down directions.

Note that it is also possible to employ a structure in which the diffuser 34 is formed having a uniform diameter from the top end to the bottom end thereof.

The inflator 32 is what is known as a cylinder-type gas generator that is formed in a circular column shape. This inflator 32 is housed inside the diffuser 34 such that an axial direction thereof is aligned with the up-down direction of the seat back 14. Note that, in the present exemplary embodiment, the up-down direction of the seat back 14 matches the axial direction of the inflator 32. A pair of upper and lower stud bolts 60 (see FIG. 1 and FIGS. 5-7) protrude towards the inner side in the seat transverse direction from an outer circumferential portion of the inflator 32. These stud bolts 60 pierce the base fabric of the diffuser 34, the base fabric of the side airbag 30, and the side wall portion 26A of the center-side side frame 26, and a nut 62 is screwed onto a distal end side of each stud bolt 60. As a consequence, the inflator 32 is fastened together with the side airbag 30 and the diffuser 34 to the center-side side frame 26.

An ECU 64 (i.e., a control unit) that is mounted in the vehicle is electronically connected to the inflator 32. A side impact sensor 66 that detects vehicle side impacts is electrically connected to this ECU 64. The ECU 64 and the side impact sensor 66 are structural components of the far side airbag device 18. When the ECU 64 has detected a vehicle side impact based on signals from the side impact sensor 66, the ECU 64 operates (i.e., activates) the inflator 32. Specifically, because the far side airbag device 18 according to the present exemplary embodiment is mounted in the vehicle seat 10, which is the driver's seat of a right-hand drive vehicle, when the ECU 64 detects that another vehicle has collided with a side portion on the vehicle seat 11 side (i.e., the left-hand side portion), which is the front passenger's side, the inflator 32 is activated. Note that it is also possible to employ a structure in which, when a pre-crash sensor that senses (i.e., predicts) a side impact is electrically connected to the ECU 64, then the inflator 32 is activated when the ECU 64 senses a side impact based on signals from the pre-crash sensor.

When the inflator 32 is activated, gas is injected into the interior of the diffuser 34 from a gas injection portion that is provided in either an upper end portion or a lower end portion (in this case, it is provided in the upper end portion) of the inflator 32. The diffuser 34 discharges gas G1 (see FIG. 6) towards the upper side of the seat back 14 from the top end aperture, and discharges gas G2 towards the lower side of the seat back 14 from the bottom end aperture. The gas G1 and G2 that is discharged from the top end aperture and the bottom end aperture is supplied to the interior of the rear bag portion 50, and is supplied to the interior of the front bag portion 48 through the upper-side communicating aperture 56 and the lower-side communicating aperture 58. As a result, the side airbag 30 is inflated and deployed. In this case, the rear bag portion 50 inflates and deploys earlier and at a greater pressure than the front bag portion 48. This rear bag portion 50 corresponds to a 'high-pressure inflating portion' of the present disclosure.

(Principal Portions of the Present Exemplary Embodiment)

Next, principal portions of the present exemplary embodiment will be described. As is shown in FIG. 3, in the present exemplary embodiment, a complex seam pattern is employed in the left and right side support portions 14B and 14C, and the seam portions (i.e., the seam lines) are set in complex shapes. As a consequence, the aesthetic appearance of the seat back 14 is improved. However, as is described above, as a result of a complex seam pattern being employed, the burst line portion 28 that is set in the center-side side support portion 14B also has a complex shape (see FIG. 1 and FIG. 7). Moreover, in the present exemplary embodiment, the upper-side reinforcement fabric 36 and the lower-side reinforcement fabric 38 (not shown in FIG. 2) are provided in order to transmit the inflation pressure of the side airbag 30 to the burst line portion 28. Hereinafter, the structures of the burst line portion 28, the upper-side reinforcement fabric 36 and the lower-side reinforcement fabric 38 will be described.

(Structure of the Burst Line Portion)

As is shown in FIG. 1, FIG. 3, FIG. 7, and FIG. 8, the burst line portion 28 is formed by a front side-seam portion (a front side-portion) 28A, a middle side-seam portion (a middle side-portion) 28B, and an upper side-seam portion (an upper side-portion) 28C. The front side-seam portion 28A extends from a bottom end of the seat back 14 towards the upper side of the seat back 14 along a front edge portion of a side surface of the center-side side support portion 14B, and a top end thereof is positioned at an equivalent height to the shoulder portion S of the vehicle occupant P1. The middle side-seam portion 28B continues on from the top end of the front side-seam portion 28A towards the rear side of the seat back 14. A rear end of this middle side-seam portion 28B is positioned adjacent to the center in the front-rear direction of the seat back 14. The upper side-seam portion 28C continues on from the rear end of the middle side-seam portion 28B towards the upper side of the seat back 14. A top end of this upper side-seam portion 28C is positioned at the top end of the seat back 14.

In this burst line portion 28, the upholstery pieces are sewn together using a weaker thread than the other seam portions. As a consequence, a structure is created in which, during the inflation and deployment of the far side airbag 30, as is described above, the burst line portion 28 receives inflation pressure from the far side airbag 30 and is ruptured.

A front seam portion 68 and a rear side-seam portion 70, which are both seam portions, branch off from the burst line portion 28. The front seam portion 68 extends from the main body portion 14A side and the lower portion side of the front surface of the center-side side support portion 14B towards the upper portion side of the side surface of the center-side side support portion 14B, and the top end thereof is connected to the top end of the front side-seam portion 28A and the front end of the middle side-seam portion 28B. The rear side-seam portion 70 extends from the rear end of the middle side-seam portion 28B and the bottom end of the upper side-seam portion 28C towards the rear end side of the seat back 14. The above-described front seam portion 68, middle side-seam portion 28B, and rear side-seam portion 70 are continuous with each other so as to form a single curved line that protrudes towards the upper side of the seat back 14 when viewed from the seat transverse direction.

Figure 7:
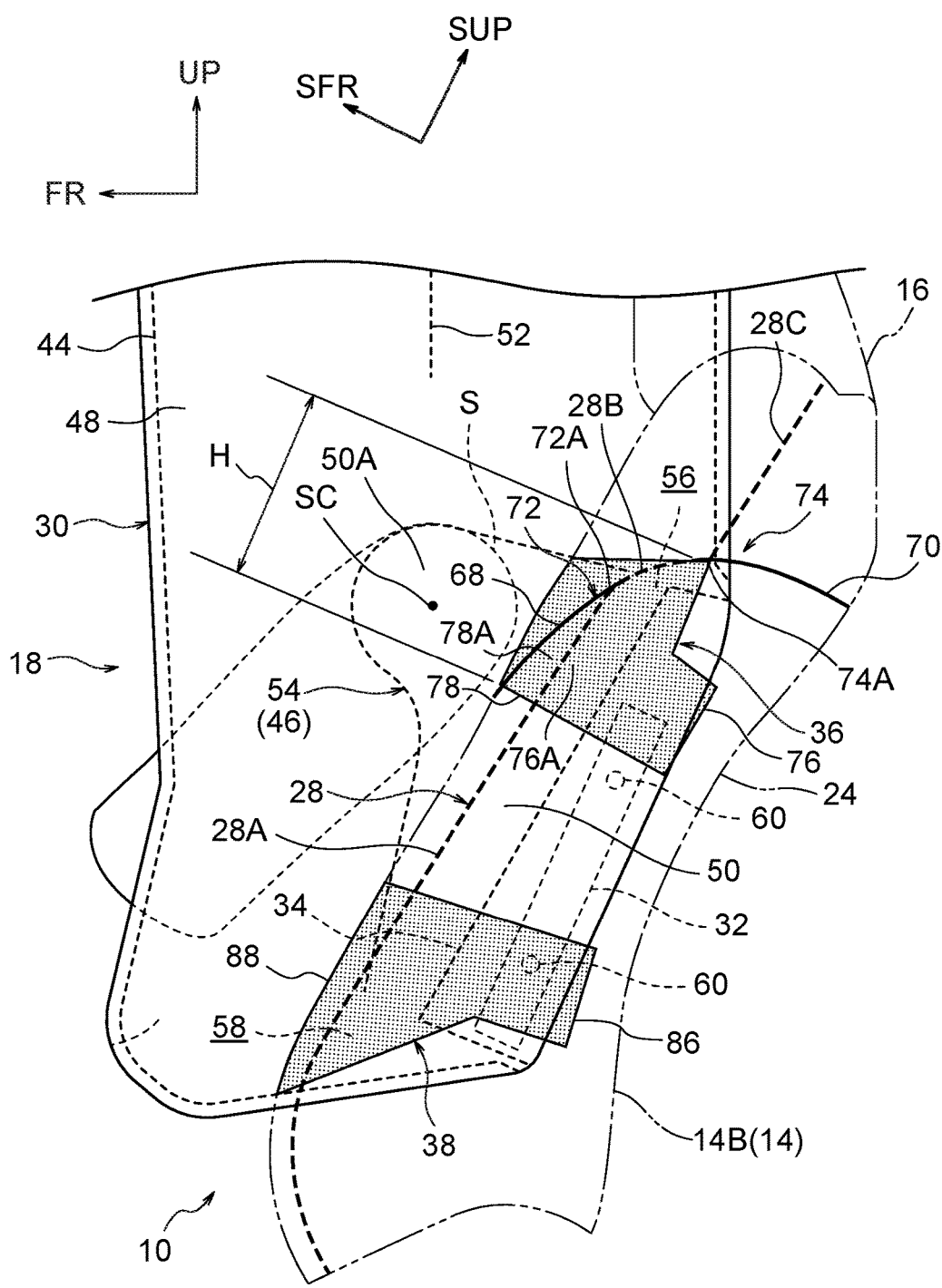
FIG. 7 is an enlarged side view showing an enlargement of a portion of FIG. 1.

As is shown in FIG. 7, as a result of the front seam portion 68 which branches off from the burst line portion 28 being provided in the seat back upholstery 24, a three-way junction 72 of seam portions is formed. This three-way junction 72 corresponds to a 'three-way junction' of the present disclosure. This three-way junction 72 is formed in an upper portion side and front portion side of the portion of the seat back upholstery 24 that forms the side surface of the center-side side support portion 14B, and is formed substantially in an inverted Y shape when viewed from the seat transverse direction. This three-way junction 72 is positioned at an equivalent height to the shoulder portion S of the vehicle occupant P1 in the up-down direction of the seat back 14. An intersection point 72A of this three-way junction 72 is the intersection point between the front seam portion 68, the front side-seam portion 28A, and the middle side-seam portion 28B.

Moreover, as a result of the rear side-seam portion 70 which branches off from the burst line portion 28 being provided in the seat back upholstery 24, a three-way junction 74 of seam portions is formed. This three-way junction 74 differs from the three-way junction according to the present disclosure, and is positioned further to the seat rear side than the three-way junction 72. Hereinafter, the three-way junction 74 is referred to as a 'rearward three-way junction 74'. The rearward three-way junction 74 is formed in the center side in the front-rear direction and the upper portion side of the portion of the seat back upholstery 24 that forms the side surface of the center-side side support portion 14B, and is formed in the shape of a Y that has been turned towards the rearward side when viewed from the seat transverse direction. An intersection point 74A of this rearward three-way junction 74 is the intersection point between the middle side-seam portion 28B, the upper side-seam portion 28C, and the rear side-seam portion 70.

(Structure of the Upper-Side Reinforcement Fabric and the Lower-Side Reinforcement Fabric)

The upper-side reinforcement fabric 36 and the lower-side reinforcement fabric 38 are formed, for example, in a belt shape from a fabric material that is more difficult to stretch than the base fabric of the side airbag 30, and are located further to the inner side of the center-side side support portion 14B than the seat back upholstery 24. The upper-side reinforcement fabric 36 corresponds to a 'reinforcement fabric' according to the present disclosure. The upper-side reinforcement fabric 36 and the lower-side reinforcement fabric 38 are each joined to the burst line portion 28 and the center-side side frame 26, and are suspended between the burst line portion 28 and the center-side side frame 26. The upper-side reinforcement fabric 36 and the lower-side reinforcement fabric 38 are formed such that they stretch when they receive inflation pressure from the side airbag 30. This is described below in more detail.

The upper-side reinforcement fabric 36 is provided around the upper portion of the airbag package 40 at an equivalent height to the shoulder portion S of the vehicle occupant P1. As is shown in FIG. 4, this upper-side reinforcement fabric 36 is separated into an outer-side fabric 76 and an inner-side fabric 78. The outer-side fabric 76 and the inner-side fabric 78 are formed substantially in an L-shape when viewed from the seat transverse direction, and a front edge side thereof is larger on the upper side of the seat back 14 than a rear edge side thereof.

The outer-side fabric 76 is disposed on the seat transverse direction outer side and the seat rearward side of the airbag package 40. A front edge portion 76A (this symbol is only marked in FIG. 4) of the outer-side fabric 76 is sewn together with both the front side-seam portion 28A and the middle side-seam portion 28B. As a consequence, the front edge portion 76A of the outer-side fabric 76 is joined (i.e., fixed) to the burst line portion 28. This outer-side fabric 76 extends to the airbag package 40 side through the aforementioned slit 42, and extends to the rear surface side of the center-side side frame 26 while following a side surface and a rear surface of the airbag package 40. A hook component 80 that is formed having a J-shaped cross-section is attached to a rear edge portion 76B (this symbol is only marked in FIG. 4) of the outer-side fabric 76.

Specifically, the rear edge portion 76B of the outer-side fabric 76 is inserted through a slit (no symbol is shown for this in the drawings) that is formed in one end portion of the hook component 80, and portions to the front and rear of the insertion slit are sewn together. As a consequence, the rear edge portion 76B of the outer-side fabric 76 is joined (i.e., anchored) to the hook component 80. This hook component 80 is joined (i.e., anchored) to a distal end portion of the rear flange portion 26C of the center-side side frame 26 via another hook component 84 (described below).

The inner-side fabric 78 is disposed on the seat transverse direction inner side and the seat forward side of the airbag package 40. A front edge portion 78A (this symbol is only marked in FIG. 4) of the inner-side fabric 78 is sewn together with both the front side-seam portion 28A and the middle side-seam portion 28B. As a consequence, the front edge portion 78A of the inner-side fabric 78 is joined (i.e., fixed) to the burst line portion 28. This inner-side fabric 78 extends to the inner side in the seat transverse direction of the airbag package 40 through the seat forward side of the pad side portion 22B, and is inserted through a reinforcement fabric insertion hole 82 that is formed in a central portion in the seat transverse direction of the pad side portion 22B, and thereafter extends to the inner side in the seat transverse direction of the center-side side frame 26. The hook component 84 that is formed having an S-shaped cross-section is attached to a rear edge portion 78B (this symbol is only indicated in FIG. 4) of the outer-side fabric 78.

This hook component 84 is integrally provided with a frame engaging portion 84A that is formed having a U-shaped cross-section, and a hook catching portion 84B that is formed having a U-shaped cross-section. A pair of slits (symbols for these are not shown in the drawings) are formed in an end portion on the opposite side from the aperture of the frame engaging portion 84A. The rear edge portion 78B of the inner-side fabric 78 is inserted through these slits, and portions to the front and rear of the insertion slit are sewn together. As a consequence, the rear edge portion 78B of the inner-side fabric 78 is joined (i.e., anchored) to the frame engaging portion 84A. Moreover, the distal end portion of the rear flange portion 26C is engaged with the inner side of the frame engaging portion 84A, and the aforementioned hook component 80 is made to catch onto the inner side of the hook catching portion 84B. As a consequence, the rear edge portion 78B of the inner-side fabric 78 is joined to the center-side side frame 26 via the hook component 84, and the rear edge portion 76B of the outer-side fabric 76 is joined to the center-side side frame 26 via the hook component 80 and the hook component 84.

The lower-side reinforcement fabric 38 is provided around the lower portion of the airbag package 40 at an equivalent height to the abdominal portion B and the hip portion L of the vehicle occupant P1. As is shown in FIG. 5, this lower-side reinforcement fabric 38 is separated into an outer-side fabric 86 and an inner-side fabric 88. The outer-side fabric 86 and the inner-side fabric 88 are formed substantially in an inverted L-shape when viewed from the seat transverse direction, and a front edge side thereof is larger on the lower side of the seat back 14 than a rear edge side thereof.

The outer-side fabric 86 is disposed on the seat transverse direction outer side and the seat rearward side of the airbag package 40. A front edge portion 86A (this symbol is only marked in FIG. 5) of the outer-side fabric 86 is sewn together with both the front side-seam portion 28A and the middle side-seam portion 28B. As a consequence, the front edge portion 86A of the outer-side fabric 86 is joined (i.e., fixed) to the burst line portion 28. This outer-side fabric 86 extends to the airbag package 40 side through the above-described slit 42, and thereafter extends to the rear surface side of the center-side side frame 26 while following a side surface and a rear surface of the airbag package 40. A hook component 80 that is formed having a J-shaped cross-section is attached by means of the same method as that used for the above-described hook component 80 to a rear edge portion 86B (this symbol is only marked in FIG. 5) of the outer-side fabric 86. This hook component 80 is joined (i.e., anchored) to a distal end portion of the rear flange portion 26C of the center-side side frame 26 via another hook component 84 (described below).

The inner-side fabric 88 is disposed on the seat transverse direction inner side and the seat forward side of the airbag package 40. A front edge portion 88A (this symbol is only marked in FIG. 5) of the inner-side fabric 88 is sewn together with both the front side-seam portion 28A and the middle side-seam portion 28B. As a consequence, the front edge portion 88A of the inner-side fabric 88 is joined to the burst line portion 28. This inner-side fabric 88 extends to the inner side in the seat transverse direction of the airbag package 40 through the seat forward side of the pad side portion 22B, and is inserted through a reinforcement fabric insertion hole 90 that is formed between the pad side portion 22B and the pad main body portion 22A, and thereafter extends to the inner side in the seat transverse direction of the center-side side frame 26. The hook component 84 that is formed having an S-shaped cross-section is attached to a rear edge portion 88B (this symbol is only marked in FIG. 5) of the outer-side fabric 88.

This hook component 84 has the same type of structure as the above-described hook component 84, and is joined (i.e., anchored) to the rear edge portion 88B of the inner-side fabric 88 by means of the same method as that used for the above-described hook component 84. In the same way as the above-described hook component 84, the distal end portion of the rear flange portion 26C is engaged with the hook component 84, and the hook component 80 is made to catch onto the hook component 84. As a consequence, the rear edge portion 88B of the inner-side fabric 88 is joined to the center-side side frame 26 via the hook component 84, and the rear edge portion 86B of the outer-side fabric 86 is joined to the center-side side frame 26 via the hook component 84 and the hook component 80. Note that the method used to join the outer-side fabrics 76 and 86 and the inner side fabrics 78 and 88 to the center-side side frame 26 is not limited to that described above, and may be suitably altered. For example, it is also possible to employ a structure in which the respective rear edge portions of the outer-side fabrics 76 and 86 and the inner side fabrics 78 and 88 are joined (i.e., fastened) to the rear surface of the rear flange portion 26C using bolts and nuts.

Here, in the present exemplary embodiment, the respective front edge portions 76A and 78A (namely, the join portions where the upper-side reinforcement fabric 36 is joined to the burst line portion 28) of the inner-side fabric 78 and the outer-side fabric 76 that are provided in the upper-side reinforcement fabric 36 are anchored to a portion of the burst line portion 28 that bridges the intersection point 72A of the three-way junction 72. This 'portion that bridges the intersection point 72A' is defined as 'portions on both sides of the intersection point 72A'. In other words, portions of the respective front edge portions 76A and 78A of the outer-side fabric 76 and the inner-side fabric 78 that are located lower down on the seat back 14 than the intersection point 72A are sewn together with the upper portion of the front side-seam portion 28A, and portions thereof that are located higher up on the seat back 14 than the intersection point 72A are sewn together with the middle side-seam portion 28B, so that the intersection point 72A is bridged in the up-down direction of the seat back 14. Note that, in the present exemplary embodiment, rear ends of the respective front edge portions 76A and 78A of the outer-side fabric 76 and the inner-side fabric 78 are positioned on the intersection point 74A of the rearward three-way junction 74, however, the present disclosure is not limited to this and it is also possible for the rear ends of the respective front edge portions 76A and 78A of the outer-side fabric 76 and the inner-side fabric 78 to be positioned between the intersection point 72A of the three-way junction 72 the intersection point 74A of the rearward three-way junction 74.

Moreover, in the present exemplary embodiment, the height in the up-down direction of the seat back 14 where the center SC of the shoulder portion S of the vehicle occupant P1 is located is also situated at the height where the respective front edge portions 76A and 78A of the outer-side fabric 76 and the inner-side fabric 78 are located. Namely, the dimension H (see FIG. 7) in the up-down direction of the seat back 14 is set such that the above-described positional relationship is established for the respective front edge portions 76A and 78A of the outer-side fabric 76 and the inner-side fabric 78.

Moreover, in the present exemplary embodiment, as is described above, the side airbag 30 is partitioned by the front bag portion 48 and the rear bag portion 50 (i.e., plural inflating portions). In addition, as is shown in FIG. 7, a structure is employed in which an upper portion (i.e., one portion) of the rear bag portion 50 (i.e., a high-pressure inflating portion) is inflated and deployed further to the seat front side than the burst line 28 at a height where the upper-side reinforcement fabric 36 and the three-way junction 72 are located. Moreover, the shoulder restraining portion 50A that restrains the shoulder portion S of the vehicle occupant P1 from the side is included in this one portion. In other words, in the present exemplary embodiment, an area where the rear bag portion 50 is inflated and deployed overlaps with an area where the upper-side reinforcement fabric 36 and the three-way junction 72 are located when seen in a seat side view. Note that, in the present exemplary embodiment, a structure is employed in which not only an upper portion of the rear bag portion 50, but also an intermediate portion thereof in the up-down direction is inflated and deployed further to the seat front side than the burst line 28.

Moreover, in the present exemplary embodiment, as is shown in FIG. 4, the upper-side reinforcement fabric 36 surrounds the upper portion of the airbag package (i.e., the side airbag 30 when this is in a stored state) from both sides in the seat transverse direction via the outer-side fabric 76 and the inner-side fabric 78. Furthermore, as is shown in FIG. 5, the lower-side reinforcement fabric 38 surrounds the lower portion of the airbag package from both sides in the seat transverse direction via the outer-side fabric 86 and the inner-side fabric 88. During the inflation and deployment of the side airbag 30, the upper-side reinforcement fabric 36 and the lower-side reinforcement fabric 38 receive inflation force from the side airbag 30 and are stretched. As a consequence, the tension in the upper-side reinforcement fabric 36 and the lower-side reinforcement fabric 38 is concentrated in the respective join portions where the upper-side reinforcement fabric 36 and the lower-side reinforcement fabric 38 are joined to the burst line portion 28. As a result, a structure is created in which the rupturing of the burst line portion 28 starts from these respective join portions.

Figure 8:
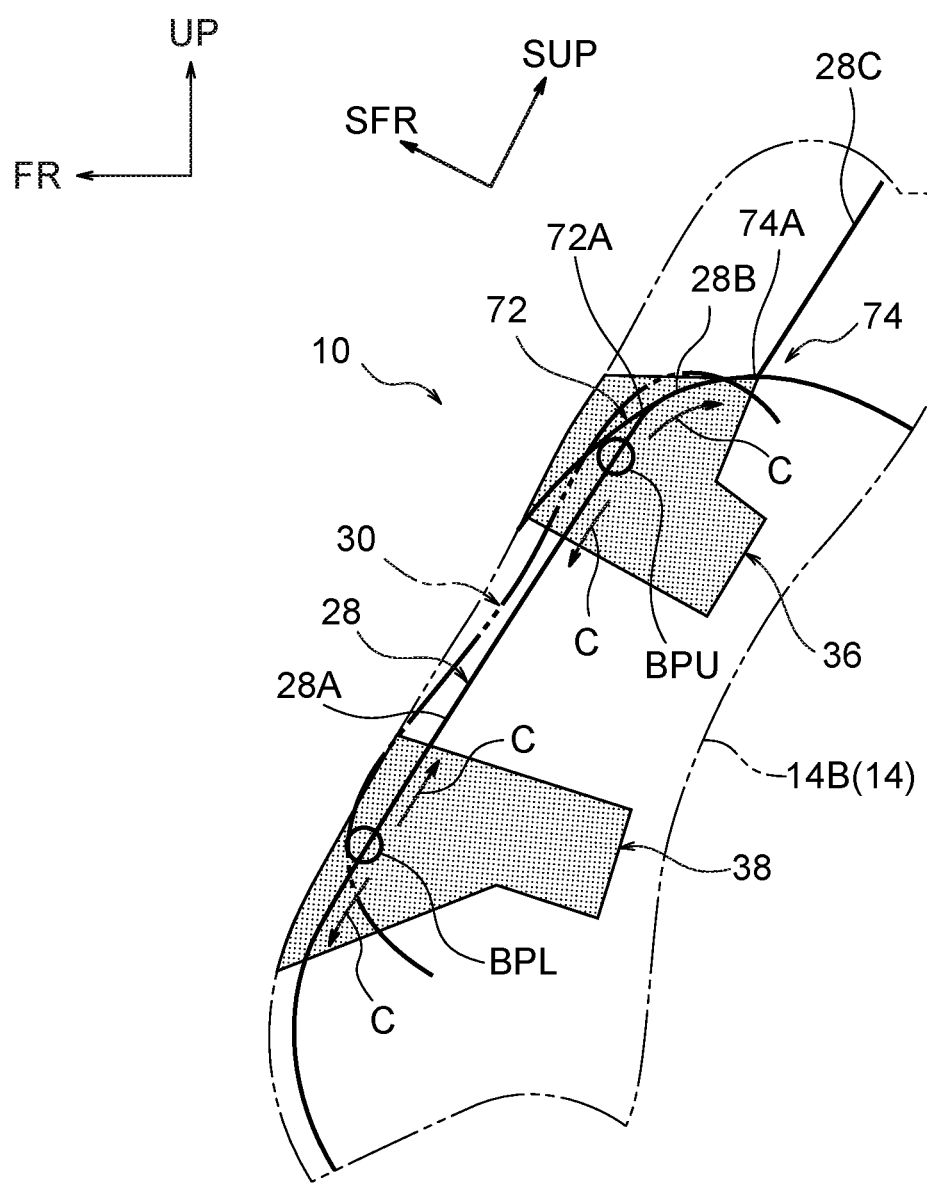
FIG. 8 is a side view corresponding to a portion of FIG. 1 that illustrates a relationship between a deployment behavior of an airbag and a placement of a reinforcement fabric.

Note that, in FIG. 8, circle marks and the symbols BPU and BPL indicate the rupturing start positions of the burst line portion 28. Moreover, the arrows C in FIG. 8 show the directions in which the rupturing of the burst line portion 28 is transmitted. These rupturing start positions BPU and BPL are determined by the placement of the upper-side reinforcement fabric 36 and the lower-side reinforcement fabric 38. The placement of the upper-side reinforcement fabric 36 and the placement of the lower-side reinforcement fabric 38 are set so as to correspond to the upper location and the lower location where the inflating side airbag 30 (see the side airbag 30 shown by the double-dot chain line in FIG. 8) reaches the burst line portion 28 earliest inside the center-side side support portion 14B. Moreover, the upper location and the lower location are determined by the positions of the top end aperture and the bottom end aperture of the diffuser 34.

(Operation and Effects)

Next, the operation and effects of the present exemplary embodiment will be described.

In the far side airbag device 18 having the above-described structure, when the ECU detects a side impact based on a signal from the side impact sensor 66, the inflator 32 is activated, and gas is injected into the interior of the side airbag 30 from the gas injection portion of the inflator 32. As a consequence, the side airbag 30 is inflated and deployed on the center side in the vehicle transverse direction of the vehicle occupant P1, and the portion from the head portion H to the hip portion L of the vehicle occupant P1 is protected (i.e., restrained) from the center side in the vehicle transverse direction by the side airbag 30.

Here, during this inflation and deployment, the burst line portion 28, which is a seam portion in the seat back upholstery 24, receives inflation pressure from the side airbag 30 and ruptures. In this seat back upholstery 24, as a result of the front seam portion 68 which branches off from the burst line portion 28 being provided, the three-way junction 72 is formed in the seam portion, and the upper-side reinforcement fabric 36 is joined to the portion of the burst line portion 28 that bridges the intersection point 72A of the three-way junction 72, and to the center-side side frame 26. As a result of the upper-side reinforcement fabric 36 receiving inflation pressure from the side airbag 30 and being stretched, the inflation pressure from the side airbag 30 is concentrated in the portion of the burst line portion 28 that bridges the intersection point 72A. As a consequence, it is possible to prevent a delay from occurring in the rupturing of the burst line portion 28 in the three-way junction 72. As a result, because the rupturing of the burst line portion 28 can be transmitted smoothly to the upper side of the three-way junction 72, the deployment behavior of the side airbag 30 can be stabilized, and the side airbag 30 can be easily inflated and deployed in a desired position.

Moreover, in the present exemplary embodiment, the side airbag is partitioned into the front bag portion 48 and the rear bag portion 50. In addition, of the front bag portion 48 and the rear bag portion 50, the portion of the rear bag portion 50 that is inflated and deployed earliest and at the highest pressure is inflated and deployed further to the seat front side than the burst line portion 28 at the height where the upper-side reinforcement fabric 36 and the three-way junction 72 are located. During this inflation and deployment, the upper-side reinforcement fabric 36 receives inflation pressure from the rear bag portion 50 and is stretched, and the inflation pressure from the rear bag portion 50 (i.e., a high-pressure inflating portion) is concentrated in the portion of the burst line portion 28 that bridges the intersection point 72A of the three-way junction 72. As a consequence, it is possible to cause the portion of the burst line portion 28 that bridges the intersection point 72A to be ruptured at an early stage. Furthermore, because the rear bag portion 50 (i.e., a high-pressure inflating portion) breaks through the portion that bridges the intersection point 72A and protrudes onto the seat front side, any delay in the rupturing of the burst line portion 28 in the three-way junction 72 can be effectively prevented.

Moreover, as is described above, the portion of the burst line portion 28 that bridges the intersection point 72A of the three-way junction 72 is made to rupture at an early stage, and the one portion of the rear bag portion 50 that inflates further to the seat front side than the three-way junction 72 includes the shoulder restraining portion 50A that restrains the shoulder portion S of the vehicle occupant P1 from the side. Here, as is shown in FIG. 2, as a result of the shoulder portion S of the adjacent vehicle occupant P2 being present at the side of the shoulder portion S of the vehicle occupant P1, in some cases, the space where the side airbag 30 is inflated and deployed may be somewhat narrow. Even in cases such as this, by employing the above-described structure, the shoulder restraining portion 50A can be inflated and deployed rapidly in this narrow space.

Moreover, in the present exemplary embodiment, the height where the center CS of the shoulder portion S of the vehicle occupant P1 is located in the up-down direction of the seat back 14 is also situated at the height where the join portion where the upper-side reinforcement fabric 36 (i.e., the respective front edge portions 76A and 78A of the outer-side fabric 76 and the inner-side fabric 78) is joined to the burst line portion 28 is located. Because of this, the burst line portion 28 can be made to rupture at an early stage at the height in the up-down direction of the seat back 14 where the above-described center SC is located. As a consequence, the side airbag 30 can be inflated and deployed rapidly in the narrow space between the shoulder portion S of the vehicle occupant P1 and the shoulder portion S of the vehicle occupant P2.

Note that when the side airbag is what is known as a single chamber-type airbag which is not separated into plural inflating portions, because the entire side airbag is inflated at the same time by the gas from the inflator, it takes time for the internal pressure to increase inside the entire airbag. As a result, compared with the present exemplary embodiment, there is a delay in the rupturing of the burst line portion, and there is also a delay in the deployment of the side airbag into the above-described narrow space. This drawback can be avoided in the present exemplary embodiment.

Moreover, in the present exemplary embodiment, as is shown in FIG. 2 and the like, the burst line portion 28 is set at the front edge portion side of a side surface of the center-side side support portion 14B. As a consequence, because the deployment direction of the side airbag 30 can be tilted towards the center side in the vehicle transverse direction, it is possible to prevent or inhibit the inflating and deploying side airbag 30 from interfering with the shoulder portion S of the vehicle occupant P1. Namely, when the burst line portion is set to the position indicated by the symbol 100 in FIG. 2 (i.e., the front edge portion of the center-side side support portion 14B), then the inflating and deploying side airbag 30 does interfere with the shoulder portion S of the vehicle occupant P1 (see the side airbag 30 shown by the double-dot chain line in FIG. 2), however, in the present exemplary embodiment this can be avoided.

Note that the symbol θ1 shown in FIG. 2 is set, for example, to approximately 15 degrees, and the symbol θ2 is set, for example, to approximately 30 degrees. By causing the side airbag 30 to inflate and deploy within the range from θ1 to θ2, the side airbag 30 can be prevented from interfering not only with the shoulder portion S of the vehicle occupant P1, but also with the shoulder portion S of the vehicle occupant P2.

Moreover, in the present exemplary embodiment, the side airbag 30 is a far side airbag that is housed within the center-side side support portion 14B of the seat back 14. Here, there are cases when a far side airbag is inflated and deployed later temporally than a side airbag (what is known as a near side airbag) that is housed within a side portion on the outer side in the vehicle transverse direction of the seat back 14. During the inflation and deployment of a near side airbag, the seam portion of the seat back upholstery 24 ruptures in a side portion on the outer side in the vehicle transverse direction of the seat back 14. As a result, because the tension in the seat back upholstery 24 is reduced, it becomes difficult for the burst line portion 28 on the center side in the vehicle transverse direction to be ruptured by the inflation pressure of the side airbag 30.

For this reason, in the present exemplary embodiment, the upper-side reinforcement fabric 36 and the lower-side reinforcement fabric 38, which are joined to the burst line portion 28 and the center-side side frame 26, surround the side airbag 30 when this is in a stored state from both sides in the seat transverse direction. As a consequence, irrespective of any decrease in the tension of the seat back upholstery 24 such as that described above, because the inflation pressure of the side airbag 30 is transmitted to the burst line portion 28 via the upper-side reinforcement fabric 36 and the lower-side reinforcement fabric 38, the burst line portion 28 can be reliably ruptured.

[Supplementary Description of the Exemplary Embodiment]

In the above-described exemplary embodiment, a case is described in which the present disclosure is applied to the vehicle seat 10 that is provided with the far side airbag device 18 that is mounted in the center-side side support portion 14B (i.e., the side portion of the center side in the vehicle transverse direction) of the seat back 14, however, the present disclosure is not limited to this. Namely, the present disclosure can also be applied to vehicle seats provided with a near side airbag device that is mounted in a side portion on the outer side in the vehicle transverse direction of the seat back 14. In this case, it is possible to omit the inner-side fabrics 78 and 88 of the upper-side reinforcement fabric 36 and the lower-side reinforcement fabric 38. Furthermore, in this case, the side airbag (i.e., the near side airbag) is formed at a size, for example, that is large enough to protect from the shoulder portion to the abdominal portion or hip portion of a seated vehicle occupant.

Moreover, in the above-described exemplary embodiment, a case is described in which the present disclosure is applied to a vehicle seat 10 which is the driver's seat of a right-hand drive vehicle (i.e., which is disposed on the right-hand side of a vehicle cabin), however, the present disclosure is not limited to this and the present disclosure may also be applied to vehicle seats that are disposed on the left-hand side of a vehicle cabin. In this case, the structure has left-right symmetry with the structure described above.

Moreover, in the above-described exemplary embodiment, a structure is employed in which the height where the center CS of the shoulder portion of the vehicle occupant P1 is located in the up-down direction of the seat back 14 is also situated at the height where the join portion where the upper-side reinforcement fabric 36 is joined to the burst line portion 28 is located, however, the present disclosure is not limited to this and the placement of the upper-side reinforcement fabric 36 can be suitably altered to match the placement of the three-way junction 72.

Moreover, in the above-described exemplary embodiment, a structure is employed in which the side airbag 30 is partitioned into two inflating portions (i.e., the front bag portion 48 and the rear bag portion 50), however, the present disclosure is not limited to this and it is also possible to employ a structure in which the side airbag 30 is partitioned into three or more inflating portions. It is also possible to employ a structure in which the side airbag 30 is partitioned in an up-down direction. Furthermore, it is also possible to employ a structure in which the side airbag 30 is formed by just a single inflating portion.

Moreover, in the above-described exemplary embodiment, a structure is employed in which a portion of the rear bag portion 50, which is a high-pressure inflating portion, inflates and deploys further to the seat front side than the burst line portion 28 at the height where the upper-side reinforcement fabric 36 is located, however, the present disclosure is not limited to this and it is also possible to employ a structure in which the rear bag portion 50 is not inflated and deployed further to the seat front side than the burst line portion 28.

Moreover, in the present exemplary embodiment, a structure is employed in which the aforementioned portion of the rear bag portion 50 includes the shoulder restraining portion 50A which restrains the shoulder portion S of the vehicle occupant P1 from the side, however, the present disclosure is not limited to this and it is also possible to employ a structure in which the rear bag portion 50 does not include the shoulder restraining portion 50A.

Moreover, in the above-described exemplary embodiment, a structure is employed in which the partitioning portion 46 of the side airbag 30 is provided with the circular arc-shaped partitioning portion 54C, however, the present disclosure is not limited to this and it is also possible to employ a structure in which the circular arc-shaped partitioning portion 54C is omitted. In this case, a structure is employed in which the front-rear partitioning portion 54B extends to the upper end side of the side airbag 30, and the upper end portion of the front-rear partitioning portion 54B is connected to the front end portion of the up-down partitioning portion 54A.

In addition, various modifications and the like may be made insofar as they do not depart from the spirit or scope of the present disclosure. Furthermore, it is to be understood that the scope of claims of the present disclosure is not limited to the above-described exemplary embodiment.

What is claimed is:

1. A vehicle seat provided with a side airbag device comprising:
   a side airbag that is stored within a side portion of a seat back, and that receives gas supplied from an inflator so as to inflate and deploy at a side of a seated vehicle occupant;
   seat back upholstery that forms upholstery for the seat back, and in which a seam portion is formed, the seam portion comprising:
   a burst line portion, which is configured to rupture in response to inflation pressure from the side airbag,
   a front seam portion that branches off from the burst line portion, and a three-way junction formed in the seam portion as a result of the front seam portion that branches off from the burst line portion; and reinforcement fabric that is joined to both a portion of the burst line portion that bridges an intersection point of the three-way junction and a seat back frame, and that is configured to stretch in response to inflation pressure from the side airbag.

2. The vehicle seat provided with the side airbag device according to claim 1, wherein:

the side airbag is partitioned into a plurality of inflating portions, and one portion of a high-pressure inflating portion, which inflates and deploys first and at a highest pressure from among the plurality of inflating portions, inflates and deploys further to a seat front side than the burst line portion at a height where the reinforcement fabric is located.

3. The vehicle seat provided with the side airbag device according to claim 2, wherein the one portion of the high-pressure inflating portion includes a shoulder restraining portion that restrains a side of a shoulder portion of the seated vehicle occupant.

4. The vehicle seat provided with the side airbag device according to claim 1, wherein a position of a join portion, where the reinforcement fabric is joined to the burst line portion, in an up-down direction of the seat back is aligned with a position of a center of a shoulder portion of the seated vehicle occupant when the seated vehicle occupant is a World Side Impact Dummy AM50.

5. The vehicle seat provided with the side airbag device according to claim 1, wherein the side airbag is stored within a side portion on a center side in a vehicle transverse direction of the seat back, and the side airbag is surrounded in this stored state from both sides in a seat transverse direction by the reinforcement fabric.

6. The vehicle seat provided with the side airbag device according to claim 1, wherein the reinforcement fabric is formed in a belt shape from a fabric material that is less stretchable than a base fabric of the side airbag.

7. The vehicle seat provided with the side airbag device according to claim 6, wherein the reinforcement fabric is located further to an inner side of the side portion of the seat back than the seat back upholstery.

8. The vehicle seat provided with the side airbag device according to claim 1, wherein:

the burst line portion comprises:

a first burst line portion located at a position below the intersection point of the three-way junction; and a second burst line portion that extends from an upper end of the first burst line portion to a rearward side of the vehicle;

the intersection point of the three-way junction is an intersection of the upper end of the first burst line portion, a front end of the second burst line portion, and the front seam portion; and a portion of a front edge portion of the reinforcement fabric that is located at a position below the intersection point of the three-way junction is sewn together with an upper portion of the first burst line portion, and a portion of the front edge portion of the reinforcement fabric that is located above the intersection point of the three-way junction is sewn together with the second burst line portion.

* * * * *